US010849049B2

(12) United States Patent
Sugirtharaj et al.

(10) Patent No.: US 10,849,049 B2
(45) Date of Patent: *Nov. 24, 2020

(54) APPARATUS AND METHOD FOR PERIODIC HIGH PRIORITY TRANSMISSION ALIGNED SCHEDULING

(71) Applicant: Telefonaktiebolaget LM Ericsson (publ), Stockholm (SE)

(72) Inventors: David Sugirtharaj, Lund (SE); Peter Alriksson, Hörby (SE); Emma Wittenmark, Lund (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/722,619

(22) Filed: Dec. 20, 2019

(65) Prior Publication Data

US 2020/0128474 A1  Apr. 23, 2020

Related U.S. Application Data

(63) Continuation of application No. 15/767,159, filed as application No. PCT/EP2016/069583 on Aug. 18, 2016, now Pat. No. 10,609,624.

(Continued)

(51) Int. Cl.
*H04W 48/08* (2009.01)
*H04L 5/00* (2006.01)
(Continued)

(52) U.S. Cl.
CPC .......... *H04W 48/08* (2013.01); *H04L 5/0035* (2013.01); *H04L 5/0044* (2013.01);
(Continued)

(58) Field of Classification Search
CPC . H04W 48/08; H04W 16/14; H04W 74/0808; H04W 72/042; H04L 5/0053; H04L 5/0035; H04L 5/0044; H04L 5/0048
See application file for complete search history.

(56) References Cited

U.S. PATENT DOCUMENTS

2013/0235773 A1\* 9/2013 Wang ................ H04W 52/0203
370/311
2014/0341018 A1 11/2014 Bhushan et al.
(Continued)

FOREIGN PATENT DOCUMENTS

CN 104717687 A 6/2015
CN 104968052 A 10/2015
(Continued)

OTHER PUBLICATIONS

3rd Generation Partnership Project, "LTE; Evolved Universal Terrestrial Radio Access (E-UTRA); Physical layer procedures", 3GPP TS 36.213 version 13.2.0 Release 13, Aug. 1, 2016, pp. 1-383, ETSI.
(Continued)

Primary Examiner — Ajay Cattungal
(74) Attorney, Agent, or Firm — Coats + Bennett, PLLC

(57) ABSTRACT

A method implemented in a network node for transmitting data to a wireless device, wherein the data is time aligned with a periodic high priority transmission. The method includes defining a zone prior to the occasion of the periodic high priority transmission where data packets could be aligned, identifying suitable data packets to schedule in the zone prior to the periodic high priority transmission, performing a clear channel assessment (CCA), and transmitting the periodic high priority transmission and potentially the data packets. A related arrangement and computer program product is also described.

20 Claims, 6 Drawing Sheets

Related U.S. Application Data

(60) Provisional application No. 62/242,585, filed on Oct. 16, 2015.

(51) Int. Cl.
  *H04W 16/14* (2009.01)
  *H04W 74/08* (2009.01)
  *H04W 72/04* (2009.01)

(52) U.S. Cl.
  CPC .......... *H04L 5/0048* (2013.01); *H04L 5/0053* (2013.01); *H04W 16/14* (2013.01); *H04W 74/0808* (2013.01); *H04W 72/042* (2013.01)

(56) References Cited

U.S. PATENT DOCUMENTS

| | | | |
|---|---|---|---|
| 2015/0092703 A1 | 4/2015 | Xu et al. | |
| 2015/0172950 A1 | 6/2015 | Chen et al. | |
| 2016/0127098 A1* | 5/2016 | Ng | H04L 5/0048 370/329 |
| 2016/0212768 A1* | 7/2016 | Wentink | H04W 16/14 |
| 2016/0302230 A1 | 10/2016 | Novlan et al. | |
| 2016/0309512 A1* | 10/2016 | Li | H04W 74/0816 |
| 2016/0338104 A1* | 11/2016 | Yin | H04W 72/0446 |
| 2017/0048718 A1* | 2/2017 | Kim | H04W 56/0005 |
| 2017/0048857 A1* | 2/2017 | Vajapeyam | H04W 72/0413 |
| 2017/0078995 A1* | 3/2017 | Dinan | H04W 16/14 |
| 2018/0020479 A1 | 1/2018 | Harada et al. | |
| 2018/0115981 A1* | 4/2018 | Kim | H04W 24/10 |
| 2018/0220459 A1* | 8/2018 | Park | H04W 48/10 |
| 2018/0367282 A1* | 12/2018 | Li | H04W 72/0446 |

FOREIGN PATENT DOCUMENTS

| | | |
|---|---|---|
| WO | 2015103632 A1 | 7/2015 |
| WO | 2015167232 A1 | 11/2015 |
| WO | 2016121917 A1 | 8/2016 |

OTHER PUBLICATIONS

3rd Generation Partnership Project, "3rd Generation Partnership Project; Technical Specification Group Radio Access Network; Study on Licensed-Assisted Access to Unlicensed Spectrum; (Release 13)", Technical Report, 3GPP TR 36.889 V13.0.0, Jun. 1, 2015, pp. 1-285, 3GPP, France.

3rd Generation Partnership Project, "3rd Generation Partnership Project; Technical Specification Group Radio Access Network; Evolved Universal Terrestrial Radio Access (E-UTRA); Physical channels and modulation (Release 11)", Technical Specification, 3GPP TS 36.211 V11.4.0, Sep. 1, 2013, pp. 1-120, 3GPP, France.

3rd Generation Partnership Project, "3rd Generation Partnership Project; Technical Specification Group Radio Access Network; Evolved Universal Terrestrial Radio Access (E-UTRA); Physical layer procedures (Release 11)", Technical Specification, 3GPP TS 36.213 V11.4.0, Sep. 1, 2013, pp. 1-182, 3GPP, France.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 11)", Technical Specification, 3GPP TS 36.331 V11.5.0, Sep. 1, 2013, pp. 1-347, 3GPP, France.

3rd Generation Partnership Project, "3rd Generation Partnership Project; Technical Specification Group Radio Access Network; Study on Licensed-Assisted Access to Unlicensed Spectrum; (Release 13)", Technical Report, 3GPP TR 36.889 V1.0.0, May 1, 2015, pp. 1-286, 3GPP, France.

* cited by examiner

Cell/TP 1

Cell/TP 2

APPARATUS AND METHOD FOR PERIODIC HIGH PRIORITY TRANSMISSION ALIGNED SCHEDULING

RELATED APPLICATIONS

The present application is a continuation of U.S. patent application Ser. No. 15/767,159, filed 10 Apr. 2018, which is a national stage application of PCT/EP2016/069583, filed 18 Aug. 2016, and claims benefit of U.S. Provisional Application 62/242,585, filed Oct. 16, 2015, the disclosures of each of which are incorporated herein by reference in their entirety.

TECHNICAL FIELD

The present invention relates generally to the field of wireless communication. More particularly, it relates to channel selection in wireless communication networks.

BACKGROUND

The 3GPP initiative "License Assisted Access" (LAA) intends to allow LTE (Long Term Evolution) equipment to also operate in the unlicensed radio spectrum such as the 5 GHz band. The unlicensed spectrum is used as a complement to the licensed spectrum. Accordingly, User Equipment (UE) devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

In addition to LAA operation, it should be possible to run LTE fully on the unlicensed band without the support from the licensed band. This is called LTE-U Stand Alone.

Regulatory requirements, however, may not permit transmissions in the unlicensed spectrum without prior channel sensing. Since the unlicensed spectrum must be shared with other radio devices of similar or dissimilar wireless technologies, a so called listen-before-talk (LBT) method needs to be applied. Today, the unlicensed 5 GHz spectrum is mainly used by equipment implementing the IEEE 802.11 Wireless Local Area Network (WLAN) standard. This standard is known under its marketing brand "Wi-Fi."

The LBT procedure leads to uncertainty at the base station or node (eNB) regarding whether it will be able to transmit one or more Downlink (DL) subframe(s) or not. This leads to a corresponding uncertainty at the user equipment (UE), also referred to as wireless communication device or terminal in this disclosure, as to whether it actually has a subframe to decode or not. An analogous uncertainty exists in the Uplink (UL) direction where the eNB is uncertain if the UEs scheduled on the SCell actually made a transmission or not.

LTE uses OFDM (Orthogonal Frequency Division Multiplexing) in the downlink and (Discrete Fourier Transform) DFT-spread OFDM (also referred to as single-carrier Frequency Division Multiple Access, FDMA) in the uplink. The basic LTE downlink physical resource can thus be seen as a time-frequency grid as illustrated in FIG. 1, where each resource element 110 corresponds to one OFDM subcarrier during one OFDM symbol interval. The uplink subframe has the same subcarrier spacing as the downlink and the same number of SC-FDMA (single carrier FDMA) symbols in the time domain as OFDM symbols in the downlink. Each OFDM symbol 110 comprises a cycling prefix 120.

In the time domain, LTE downlink transmissions are organized into radio frames of 10 ms, each radio frame consisting of ten equally-sized subframes of length Tsubframe=1 ms as shown in FIG. 2. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminal\s data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3.

From LTE Rel-11 onwards, above described resource assignments can also be scheduled on the enhanced Physical Downlink Control Channel (ePDCCH). For Rel-8 to Rel-10 only Physical Downlink Control Channel (PDCCH) is available.

The reference symbols shown in FIG. 3 are the cell specific reference symbols (CRS) and are used to support multiple functions including fine time and frequency synchronization and channel estimation for certain transmission modes.

The PDCCH/ePDCCH is used to carry downlink control information (DCI) such as scheduling decisions and power-control commands. More specifically, the DCI includes:

Downlink scheduling assignments, including PDSCH resource indication, transport format, hybrid-ARQ information, and control information related to spatial multiplexing (if applicable). A downlink scheduling assignment also includes a command for power control of the PUCCH used for transmission of hybrid-ARQ acknowledgements in response to downlink scheduling assignments.

Uplink scheduling grants, including PUSCH resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH/ePDCCH carries one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message is transmitted on separate PDCCH/ePDCCH resources, and consequently there are typically multiple simultaneous PDCCH/ePDCCH transmissions within each subframe in each cell. Furthermore, to support different radio-channel conditions, link adaptation can be used, where the code rate of the PDCCH/ePDCCH is selected by adapting the resource usage for the PDCCH/ePDCCH, to match the radio-channel conditions.

Here follows a discussion on the start symbol for PDSCH and ePDCCH within the subframe. The OFDM symbols in the first slot are numbered from 0 to 6. For transmissions modes 1-9, the starting OFDM symbol in the first slot of the subframe for ePDCCH can be configured by higher layer signaling and the same is used for the corresponding scheduled PDSCH. Both sets have the same ePDCCH starting symbol for these transmission modes. If not configured by higher layers, the start symbol for both PDSCH and ePDCCH is given by the CFI value signaled in the physical control format indicator channel (PCFICH).

Multiple OFDM starting symbol candidates can be achieved by configuring the UE in transmission mode 10, by having multiple ePDCCH physical resource block (PRB) configuration sets where for each set the starting OFDM symbol in the first slot in a subframe for ePDCCH can be configured by higher layers to be a value from {1,2,3,4}, independently for each ePDCCH set. If a set is not higher layer configured to have a fixed start symbol, then the ePDCCH start symbol for this set follows the CFI value received in PCFICH.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. CA is illustrated in FIG. 4.

A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

In addition, a key feature of carrier aggregation is the ability to perform cross-carrier scheduling. This mechanism allows a (e)PDCCH on one CC to schedule data transmissions on another CC by means of a 3-bit Carrier Indicator Field (CIF) inserted at the beginning of the (e)PDCCH messages. For data transmissions on a given CC, a UE expects to receive scheduling messages on the (e)PDCCH on just one CC—either the same CC, or a different CC via cross-carrier scheduling; this mapping from (e)PDCCH to PDSCH is also configured semi-statically.

This UE performs periodic cell search and reference signal received power (RSRP) and received signal received quality (RSRQ) measurements in radio resource control (RRC) Connected mode. It is responsible for detecting new neighbor cells, and for tracking and monitoring already detected cells. The detected cells and the associated measurement values are reported to the network. Reports to the network can be configured to be periodic or aperiodic based a particular event.

To share the channel in the unlicensed spectrum, the LAA SCell cannot occupy the channel indefinitely. One of the mechanisms for interference avoidance and coordination among small cells is SCell ON/OFF feature. In Rel-12 LTE, discovery signals were introduced to provide enhanced support for SCell ON/OFF operations. Specifically, these signals are introduced to handle potentially severe interference situation (particularly on the synchronization signals) resulted from dense deployment as well as to reduce UE inter-frequency measurement complexity.

The discovery signals in a DRS (Discovery Reference Signal) occasion are comprised of the primary synchronization signal (PSS), secondary synchronization signal (SSS), common reference signal (CRS) and when configured, the channel state information reference signals (CSI-RS). The PSS and SSS are used for coarse synchronization, when needed, and for cell identification. The CRS is used for fine time and frequency estimation and tracking and may also be used for cell validation, i.e., to confirm the cell ID detected from the PSS and SSS. The CSI-RS is another signal that can be used in dense deployments for cell or transmission point identification.

FIG. 5 shows the presence of these signals in a DRS occasion of length equal to two subframes and also shows the transmission of the signals over two different cells or transmission points. Hence, FIG. 5 shows the LTE time-frequency structure.

The DRS occasion corresponding to transmissions from a particular cell may range in duration from one to five subframes for frequency division duplex (FDD) and two to five subframes for time division duplex (TDD). The subframe in which the SSS occurs marks the starting subframe of the DRS occasion. This subframe is either subframe 0 or subframe 5 in both FDD and TDD. In TDD, the PSS appears in subframe 1 and subframe 6 while in FDD the PSS appears in the same subframe as the SSS. The CRS are transmitted in all downlink subframes and DwPTS regions of special subframes.

The discovery signals should be useable by the UE for performing cell identification, reference signal received power (RSRP) and reference signal received quality (RSRQ) measurements. The RSRP measurement definition based on discovery signals is the same as in prior releases of LTE. The RSSI measurement is defined as an average over all OFDM symbols in the downlink parts of the measured subframes within a DRS occasion. The RSRQ is then defined as

DRSRQ=N×DRSRP/DRSSI, where N is the number of PRBs used in performing the measurement, DRSRP is the RSRP measurement based on the discovery signals and DRSSI is the RSSI measured over the DRS occasion.

In Rel-12, RSRP measurements based on the CRS and CSI-RS in the DRS occasions and RSRQ measurements based on the CRS in the DRS occasions have been defined. As stated earlier, discovery signals can be used in a small cell deployment where the cells are being turned off and on or in a general deployment where the on/off feature is not being used. For instance, discovery signals could be used to make RSRP measurements on different CSI-RS configurations in the DRS occasion being used within a cell, which enables the detection of different transmission points in a shared cell.

When measurements are made on the CSI-RS in a DRS occasion, the UE restricts its measurements to a list of candidates sent to the UE by the network via RRC signaling. Each candidate in this list contains a physical cell ID (PCID), a virtual cell ID (VCID) and a subframe offset indicating the duration (in number of subframes) between the subframe where the UE receives the CSI-RS and the subframe carrying the SSS. This information allows the UE to limit its search. The UE correlates to the received signal candidates indicated by the RRC signal and reports back any CSI-RS RSRP values that have been found to meet some reporting criterion, e.g., exceeding a threshold value.

When a UE is being served on multiple carrier frequencies via a PCell and one or more SCells, the UE needs to perform RRM measurements on other cells on the currently used carrier frequencies (intra-frequency measurements) as well as on cells on other carrier frequencies (inter-frequency measurements). Since the discovery signals are not transmitted continuously, the UE typically needs to be informed about the timing of the discovery signals so as to manage its search complexity. Furthermore, when a UE is being served on as many carrier frequencies as it is capable of supporting and inter-frequency radio resource management (RRM) measurements need to be performed on a different carrier frequency that is not currently being used, the UE is assigned a measurement gap pattern. This gap pattern on a serving frequency allows the UE to retune its receiver for that frequency to the other frequency on which measurements are being performed.

During this gap duration, the UE cannot be scheduled by the eNB on the current serving frequency. Knowledge of the timing of the discovery signals is especially important when the use of such measurement gaps is needed. Beyond mitigating UE complexity, this also ensures that the UE is not unavailable for scheduling for prolonged periods of time on the current serving frequencies (PCell or SCell).

The provision of such timing information is done via a discovery measurement timing configuration (DMTC) that is signaled to the UE. The DMTC provides a window with a duration of 6 ms occurring with a certain periodicity and timing within which the UE may expect to receive discovery signals. The duration of 6 ms is the same as the measurement gap duration as defined currently in LTE and allows the measurement procedures at the UE for discovery signals to be harmonized regardless of the need for measurement gaps. Only one DMTC is provided per carrier frequency including the current serving frequencies. The UE can expect that the network will transmit discovery signals so that all cells that are intended to be discoverable on a carrier frequency transmit discovery signals within the DMTCs. Furthermore, when measurement gaps are needed, it is expected that the network will ensure sufficient overlap between the configured DMTCs and measurement gaps.

Turning to Wireless Local Area Networks, in typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the range of several APs using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. A general illustration of the listen before talk (LBT) mechanism is shown in FIG. 6.

There are several versions of LBT thus far classified in Release 13. These are

1. Category 1: No LBT
   No LBT procedure is performed by the transmitting entity.
2. Category 2: LBT without random back-off
   The duration of time that the channel is sensed to be idle before the transmitting entity transmits is deterministic.
3. Category 3: LBT with random back-off with a contention window of fixed size
   The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.
4. Category 4: LBT with random back-off with a contention window of variable size
   The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

The LBT of category 2 may be replaced by a 25 µs single-CCA as defined in 3GPP TS 36.213-§ 15.1.2 V13.2.0.

LBT of category 2 or 1 may typically be seen as aggressive channel assessment procedures, whereas category 3 and 4 LBT may typically be seen as gentle channel assessment procedures. For instance, using category 2 typically leads to a quicker flow since the channel is sensed more often and thus more traffic may be transmitted. However, category 2 may have a downside in that it may contribute to congesting the channel. Using category 4 on the other hand results in the channel being occupied less, which also leads to less transmitted data. This may be beneficial if the load on the channel needs to be decreased, but have a downside if the data that is to be transmitted on the channel is important and it's crucial that it reaches its destination quickly.

Regarding Carrier Selection, as there is a large available bandwidth of unlicensed spectrum, carrier selection is required for LAA nodes to select the carriers with low interference and with that achieve good co-existence with other unlicensed spectrum deployments. For any technology, when deploying an additional node, the first rule for achieving high-performance for the new node itself as well as for the existing nodes is to scan the available channels and select one that would receive least interference for the node itself and cause least interference to existing nodes.

The basic principle behind carrier selection is for the eNB to scan and sense channels for interference or radar detection, and configure the SCell frequency accordingly based on the outcome of its carrier selection algorithm. The carrier selection process is separate and on a different time scale from the LBT/CCA procedure prior to transmissions on the unlicensed channels. It is expensive to move all attached UEs to another carrier frequency due to the signaling required and interruptions in the data flow.

Autonomous, semi-static carrier selection can be based on the eNB sensing of the averaged interference level, potential presence of radar signals if required, and traffic load on the candidate carriers over a relatively longer time scale. Once a suitable set of carriers is identified, they are added and activated as SCells for UEs. This process may be repeated periodically over tens or hundreds of milliseconds in order to keep reassessing the interference environment, and the associated measurements do not need any new specifications. Once a set of carriers is activated after the carrier selection process, transmissions can be performed dynamically on one or more of them based on LBT and fast DTX.

For Licensed assisted access (LAA) to unlicensed spectrum using LTE, up to now, the spectrum used by LTE is dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 7, a UE is connected to a Primary Cell, PCell, in the licensed band and one or more Secondary Cells, SCells, in the unlicensed band. In this application we denote a secondary cell in unlicensed spectrum as license assisted secondary cell (LA SCell).

Recently there have also been proposals to operate LTE in unlicensed spectrum without the aid of a licensed carrier. In such an operation, the PCell will also operate on the unlicensed carrier and thus essential control signals and channels will also be subject to unmanaged interference and CCA. Such an operation is e.g. being specified in the MulteFire Alliance.

The discovery signal (DRS) in LAA is subject to LBT and therefore due to transmissions from other nodes may not always be transmitted. To partially compensate for this, a quick one-shot LBT (most likely to be Category 2 LBT or a 25 μs single-CCA as defined in 3GPP TS 36.213-§ 15.1.2 V13.2.0) is introduced in Release 13 to help the eNB prioritize the DRS transmission. Still, it might occur in some scenarios that DRS transmissions can fail and hence lead to UEs being out of synch and thus lowering the overall performance of the network.

Typically, the DRS is a 1 ms burst every 40 ms. The DMTC window is typically 6 ms.

There is furthermore a need for increasing the probability that a DRS frame is always transmitted and thus increase the robustness and stability of the network communication.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

The core essence of this invention is to schedule some data packets near the periodic DRS occasion by delaying them so that they are transmitted contiguously before the DRS occasion.

One embodiment relates to a method implemented in a network node for transmitting data to a wireless device, time aligned with a periodic high priority transmission comprising the steps of:
  defining a zone prior to the occasion of the periodic high priority transmission where data packets could be aligned
  identifying suitable data packets to schedule in the zone prior to the periodic high priority transmission
  performing a clear channel assessment
  transmitting the periodic high priority transmission and potentially the data packets.

It is an object of some embodiments to obviate at least some of the above disadvantages and to provide a method and an arrangement.

According to a first aspect this is achieved by a method.

The method may e.g. be a method implemented in a network node for transmitting data to a wireless device, time aligned with a periodic high priority transmission. The method comprises the steps of defining a zone prior to the occasion of the periodic high priority transmission where data packets could be aligned and identifying suitable data packets to schedule in the zone prior to the periodic high priority transmission.

The method also comprises the steps of performing a clear channel assessment and transmitting the periodic high priority transmission and potentially the data packets.

In some embodiments, the periodic high priority transmission is a Discovery Reference Signal (DRS) occasion and data arriving at the network node is delayed in order to be positioned in at least one subframe to be transmitted prior to, but in conjunction with the DRS occasion, wherein low latency data arriving in the zone is not delayed.

The method may further comprise filling up a subframe being closest in time to the DRS occasion with delayed data first and then filling up a number of subframes preceding the subframe being closest in time to the DRS occasion in order to build up a contiguous time period of subframes comprising delayed data.

Performing a clear channel assessment may comprise performing a first type of listen before talk—LBT—when a time for transmitting the at least one subframe comprising the delayed data and the DRS in a contiguous transmission burst is reached.

If the first type of LBT fails, the method may comprise performing a second type of LBT prior to the DRS occasion in order to transmit the at least one subframe and the DRS.

If the arriving data is scheduled using semi-persistent scheduling the method may comprise configuring the data to occupy the subframe preceding the DRS occasion.

Data arriving at the scheduler is a candidate for delaying in order to be positioned in the subframe just before the DRS occasion. Low latency data arriving in this zone does not have to be subject to this type of delay scheduling.

In some embodiments, low latency data may e.g. be voice over IP or a gaming application.

In some embodiments, the DRS occasion may define a point in time when the DRS is transmitted. The DRS may be transmitted on a reoccurring basis.

The zone prior to the DRS occasion may be a time period during which received or data which arrives to the eNB is collected and delayed and transmitted prior to but in conjunction with transmission of the DRS.

If the first type of LBT fails in transmitting the data, just before the DRS occasion the scheduler reverts to a second category LBT in order to transmit the DRS, and if data is scheduled using semi-persistent scheduling, it can be configured to occupy the subframe preceding the DRS occasion.

The second category LBT is typically chosen such that it has a higher probability to result in a successful transmission. For instance, the second category LBT may be a Category 2 LBT as defined in 3GPP TS 36.213 V13.2.0 § 15.1.2.

Semi persistent scheduling may e.g. mean that the scheduler already knows that data will come at a certain rate and thus it may reserve resources for the arriving data. For instance, voice semi persistent scheduling can be used to reserve a subframe every 20 ms, since the scheduler knows beforehand that the data will arrive every 20 ms.

In some embodiments, the first type of LBT is a category 4 LBT, and the second type of LBT is a category 2 LBT, wherein the cat 2 LBT comprises LBT without random back-off, and Category 4 LBT comprises LBT with random back-off and a variable size of a contention window.

In some embodiments, the second type of LBT is a 25 μs single-CCA LBT, wherein 25 μs single-CCA LBT comprises LBT without random back-off.

The zone may in some embodiments define a time period during which data may be received and delayed which precedes the DRS occasion.

The DRS occasion may in some embodiments be when the DRS is transmitted.

In some embodiments, the DRS may be comprised in a frame and the subframes together with the DRS frame may consist of N subframes, with the DRS frame being the Nth frame. Data that is delayed is then positioned such that subframe N-1, i.e. the subframe being closest in time to the DRS occasion, is filled first, and then subframe N-2, N-3 etc.

In some embodiments, the subframes comprising the delayed data and the DRS frame may form a contiguous transmission and being transmitted during a transmission burst. The transmission burst may e.g. be 6 ms.

According to a second aspect this is achieved by an arrangement, such as a eNB.

The second aspect may e.g. be an arrangement, such as a network node, for DRS Alignment Scheduling. The arrangement is configured for defining a zone before the DRS occasion called DRS Alignment Scheduling. Data arriving at the scheduler is a candidate for delaying in order to be positioned in the subframe just before the DRS occasion. Low latency data arriving in this zone does not have to be subject to this type of delay scheduling.

The arrangement is also configured for filling up the subframes starting with subframe (SF)N-1 first and then going backwards in time in order to build up a contiguous time period and perform a first type of LBT when the time to transmit the contiguous data/DRS burst is reached.

If the first type of LBT fails in transmitting the data, just before the DRS occasion the scheduler reverts to a second type of LBT in order to transmit the DRS, and if data is scheduled using semi-persistent scheduling, it can be configured to occupy the subframe preceding the DRS occasion.

In some embodiments, the network node is an eNB.

In some embodiments, the first type of LBT is a category 4 LBT, and the second type of LBT is a category 2 LBT, wherein the cat 2 LBT comprises LBT without random back-off, and Category 4 LBT comprises LBT with random back-off and a variable size of a contention window.

In some embodiments, the second type of LBT is a 25 μs single-Clear Channel Assessment (CCA) LBT, wherein 25 μs single-CCA LBT comprises LBT without random back-off.

A third aspect is a computer program product comprising a computer readable medium, having thereon a computer program comprising program instructions, the computer program being loadable into a data-processing unit and adapted to cause execution of the method according to the first aspect when the computer program is run by the data-processing unit.

In some embodiments the third aspect is further adapted to cause execution of the method according to the first.

In some embodiments, the second aspect may further share or have identical or similar features as the first aspect.

The proposed solution disclosed herein is to align as much as possible the data transmission coming from the same eNB in the subframes immediately preceding the subframe carrying the DRS. Data transmission are allowed to be in length 4-10 ms and use the LAA Category 4 LBT which involves randomizing the number of sensing periods the eNB must perform prior to transmission. In such a scheme, the aim is always to have the DRS subframe in the end of the transmission burst.

If we denote subframe N as the position of the DRS, the aim would be to schedule data in SF N-1 so that transmission of the DRS would not need a specific LBT but included as a part of the transmission. The eNB would then schedule SF N-2 and so on until the maximum allowed burst length is achieved.

The data arriving at the eNB could be delayed up to the maximum DRS period which is typically 40-80 ms. It may also be 40-160 ms. Hence the eNB should restrict this scheme to services with lower priority and first transmissions. Services with higher priority and HARQ re-transmissions could be excluded from such a scheme as not to impact overall system performance.

The solution(s) taught herein bring about the advantage that a better coexistence with other nodes as the DRS, when transmitted within the same burst as regular data can use a gentle Category 4 LBT instead of a more aggressive category, such as category 2 LBT or 25 μs single CCA, is achieved.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described. The described embodiments may comprise methods and arrangements enabling robust and reliable communication within a wireless network by means of grouping data transmissions together with a DRS frame and transmit them in the same transmission burst.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

Figure 1:
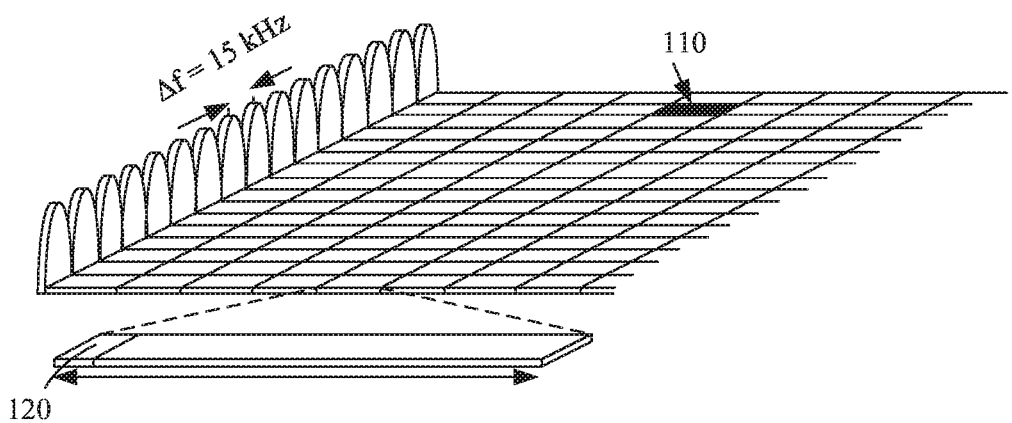
FIG. 1 is a schematic drawing illustrating an LTE downlink physical resource.
Figure 2:
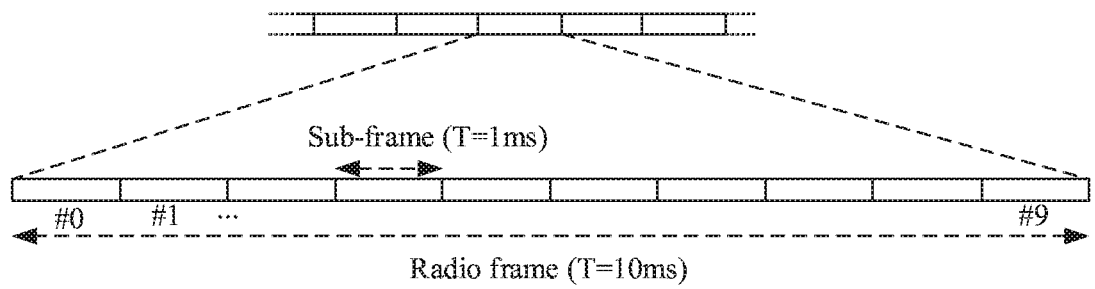
FIG. 2 illustrates an LTE time-domain structure.
Figure 3:
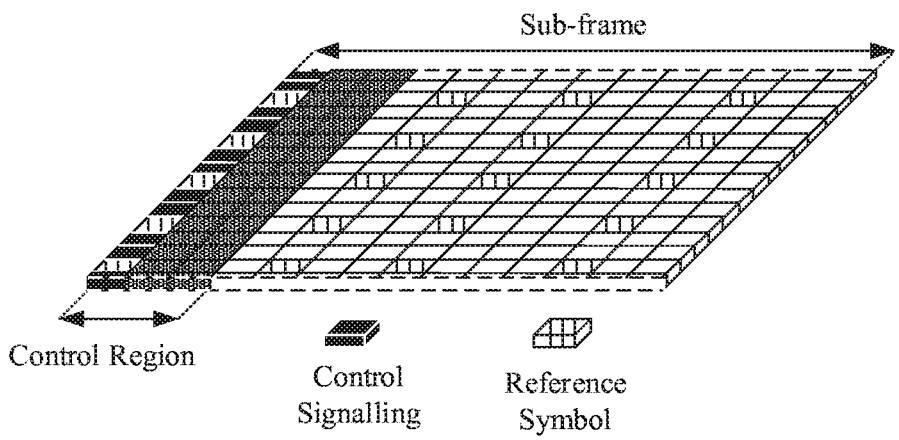
FIG. 3 illustrates a normal downlink subframe.
Figure 4:
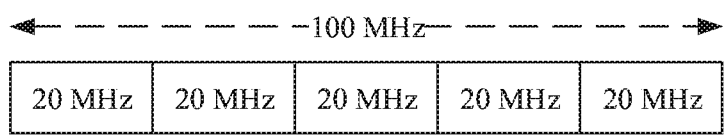
FIG. 4 is an illustration of carrier aggregation.
Figure 5:
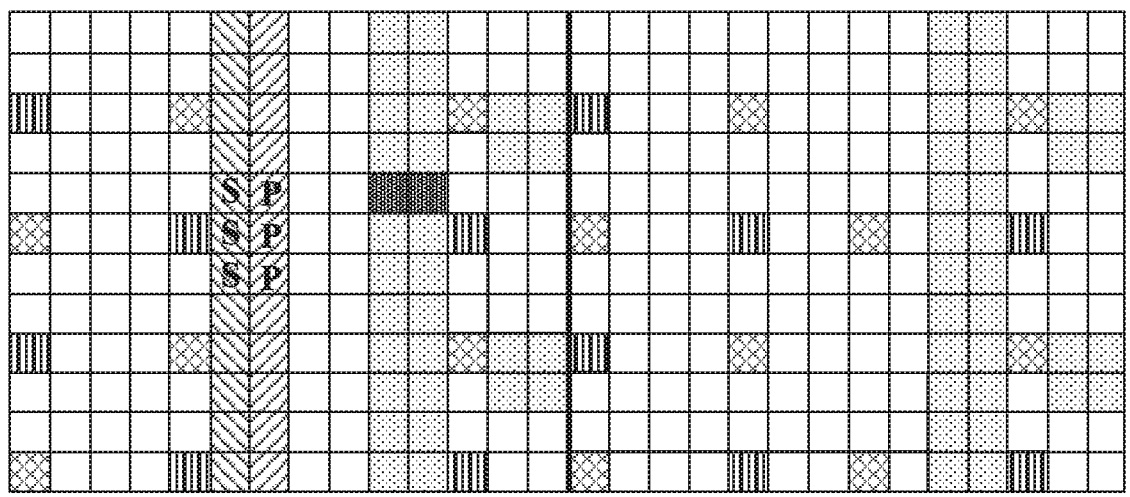
FIG. 5 is an illustration of small cell overview of on/off via SCell activation/deactivation; the LTE time-frequency structure.
Figure 5:
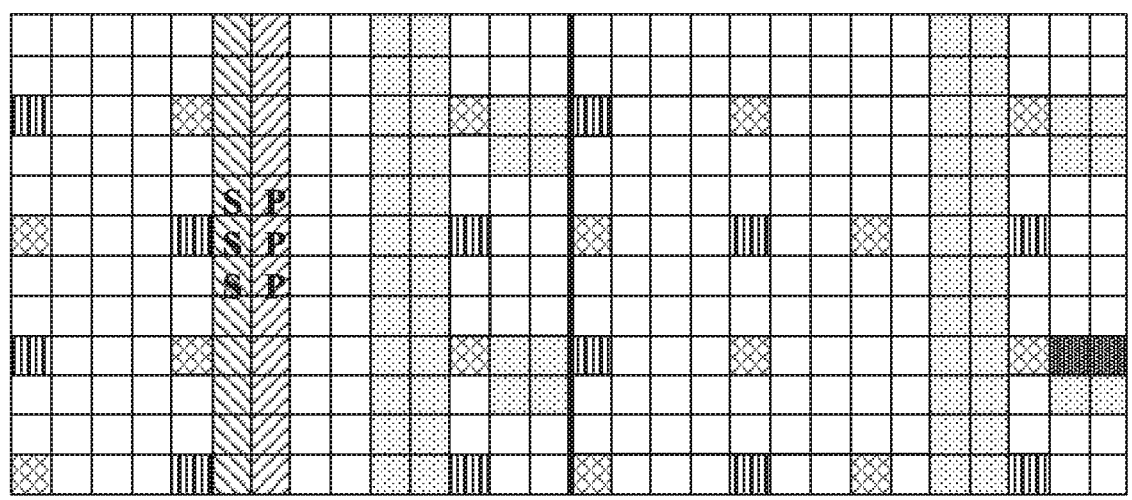
Figure 6:
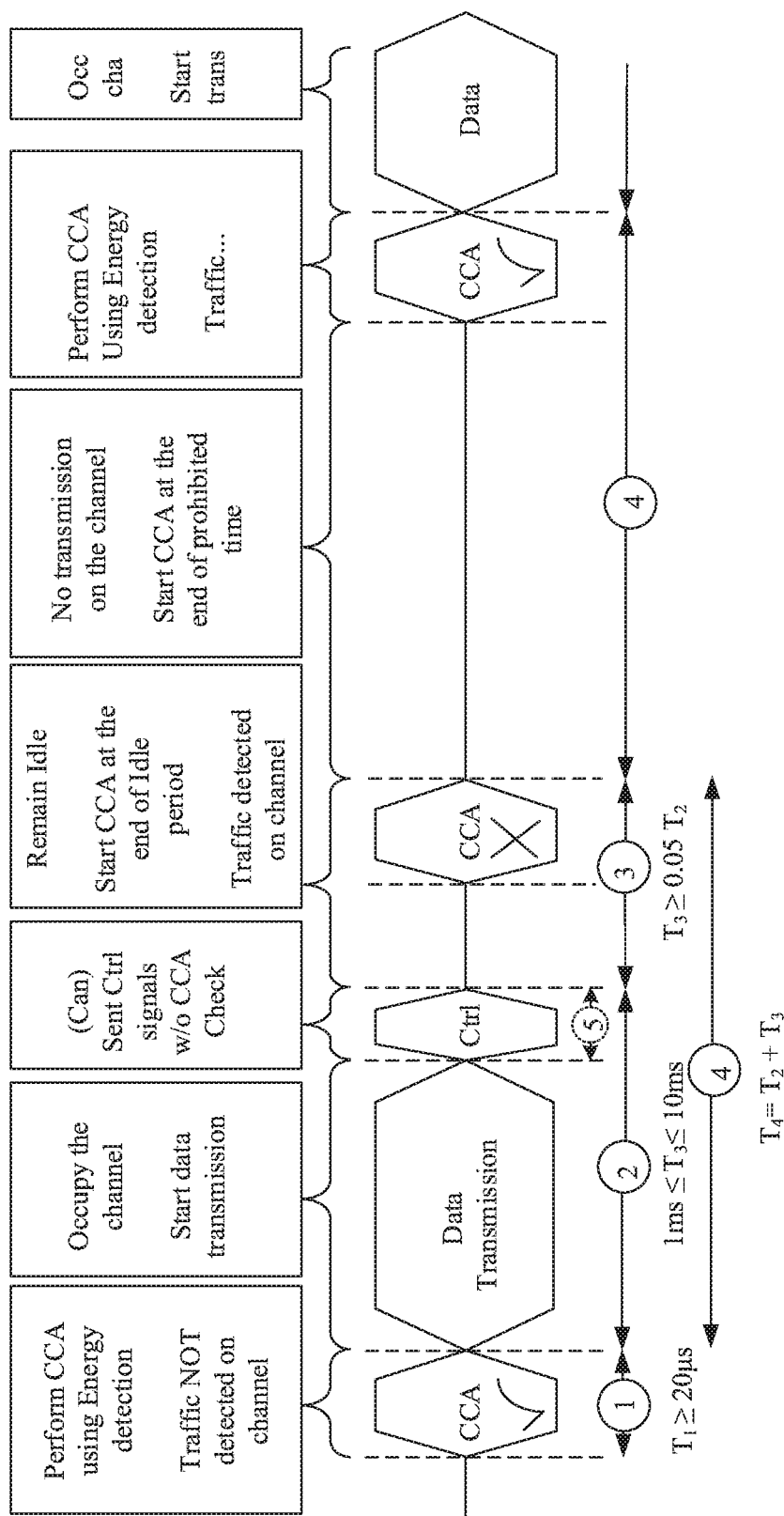
FIG. 6 is a schematic drawing illustrating a Listen Before Talk procedure.
Figure 7:
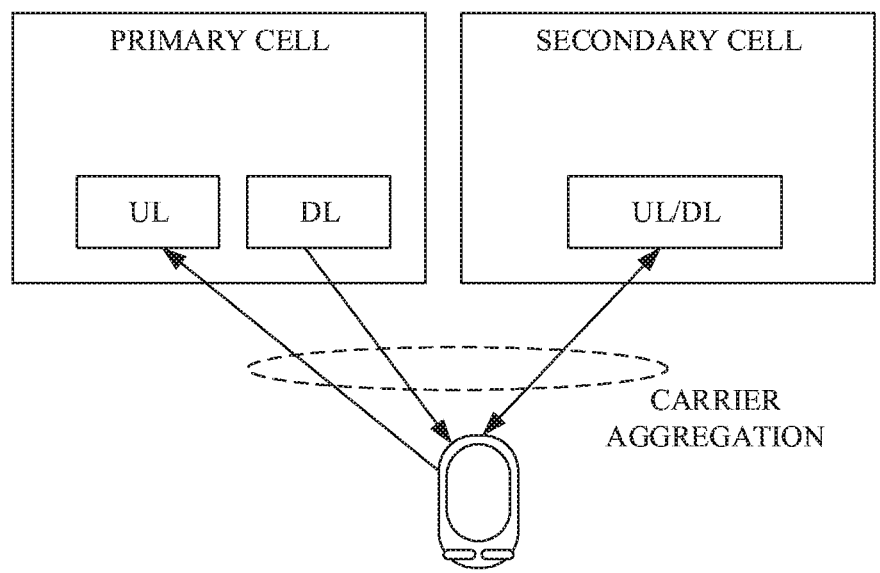
FIG. 7 is a schematic drawing illustrating Licensed-assisted access (LAA) to unlicensed spectrum using LTE carrier aggregation.
Figure 8:
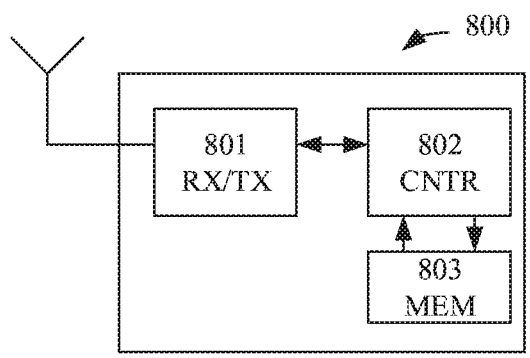
FIG. 8 is a schematic drawing illustrating an example arrangement for use in a user equipment according to some embodiments.

FIG. 8 illustrates an example arrangement for use in a user equipment (UE) for implementing a method as taught herein according to some embodiments. The UE 800 comprises a transceiver (RX/TX) 801, a controller (CNTR) 802, and a memory 803 MEM. The transceiver 801 may in some embodiments be a separate transmitter and a separate receiver. The controller 802 is configured to receive and transmit data through the transceiver, which data may be stored in the memory 803, and to execute any of the methods taught herein.

The UE 800 may e.g. be a wireless communication device or a network terminal, mobile phone, laptop, surf pad, Smart phone or the like.

Figure 9:
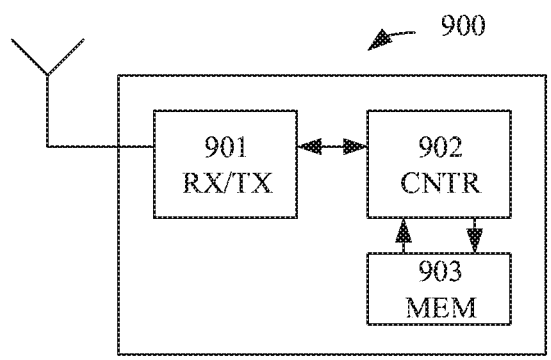
FIG. 9 is a schematic drawing illustrating an example arrangement for use in a base station according to some embodiments.

FIG. 9 illustrates an example arrangement for use in a base station eNB according to some embodiments. Example eNB 900 comprises a transceiver (RX/TX) 901, a controller (CNTR) 902, and a memory (MEM) 903. The transceiver 901 may in some embodiments be a separate transmitter and a separate receiver. The controller 902 is configured to receive and transmit data through the transceiver, which data may be stored in the memory 903, and to execute any of the methods taught herein.

Figure 11:
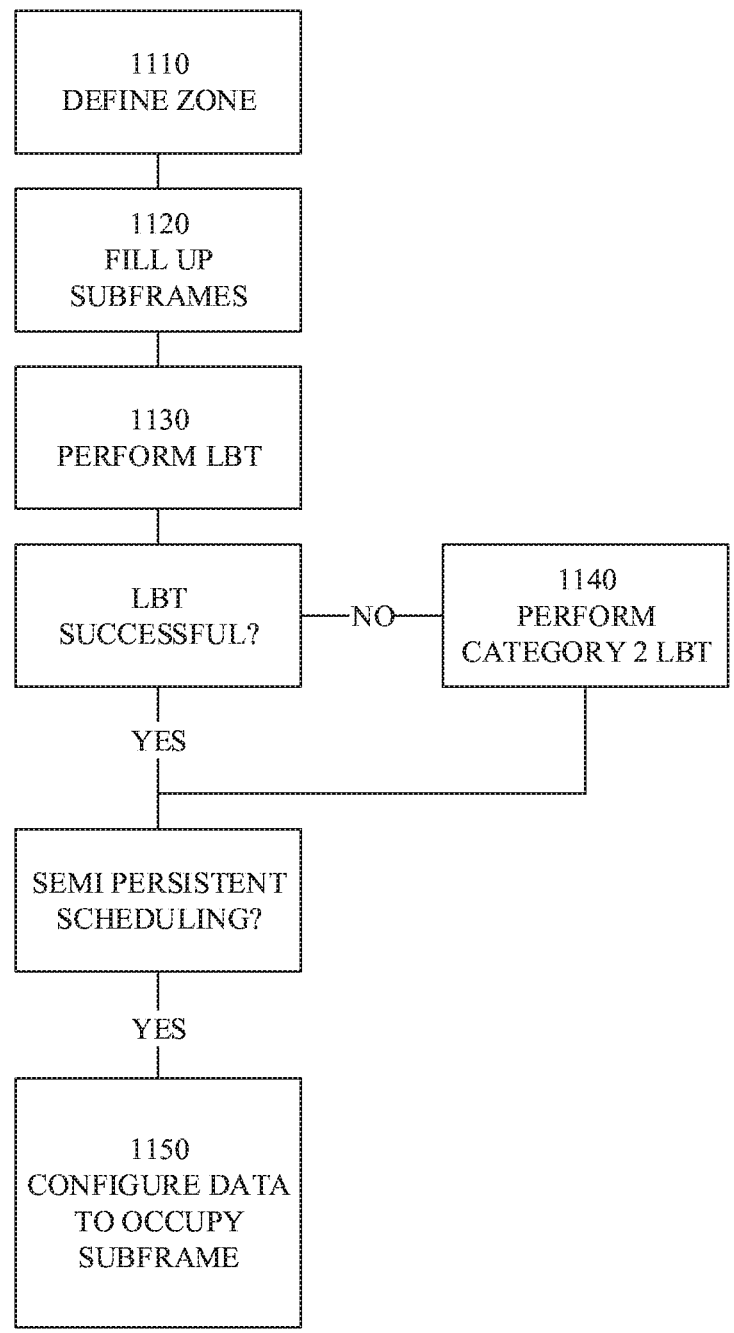
FIG. 11 is a flow chart showing a method according to one embodiment of the teachings disclosed herein.

In some embodiments, the controller 902 may consist of a plurality of aggregated means configured to cause the execution of e.g. the method described in conjunction with FIG. 11.

The controller 902 may e.g. comprise a zone definition unit configured to define a zone prior to the arrival of a DRS frame, wherein the zone may be denoted as DRS alignment scheduling. The zone may e.g. define a time period during which incoming data may be delayed.

The time period may in some embodiments be 40 ms or less.

The controller 902 may also comprise a scheduler configured to schedule incoming data such that data which arrives within the DRS alignment is scheduled to be transmitted in a transmission burst together with the DRS frame. The scheduler may refrain from delaying data which has a low latency such as voice over IP or gaming application data.

The scheduler may further be configured to fill up the frames which are prior to the DRS frame, but within the DRS alignment scheduling zone with incoming data. E.g. If the DRS frame is denoted as frame number N, then frame N-1 is filled up first, then N-2 . . . etc. When the DRS alignment scheduling zone has ended, the controller 902 may cause transmission of all frames which have been filled with delayed data and the DRS frame in one burst.

However, prior to transmitting the DRS burst, the controller 902 may be further configured to cause the execution of a listen before talk category 4 procedure to ensure that the burst can be transmitted.

If the LBT category 4 is unsuccessful, the controller 902 may be configured to revert to a higher category of LBT which may be more aggressive, such as LBT category 2 or 25 μs single-CCA.

Furthermore, if semi persistent scheduling is utilized, the controller 902 may be configured to cause the scheduler to configure the arriving data such that it occupies the subframe which precedes the DRS occasion.

Semi persistent scheduling may e.g. mean that the scheduler already knows that data will come at a certain rate and this it may reserve resources for the arriving data. For instance, voice semi persistent scheduling can be used to reserve a subframe every 20 ms, since the scheduler knows beforehand that the data will arrive every 20 ms.

Figure 10:
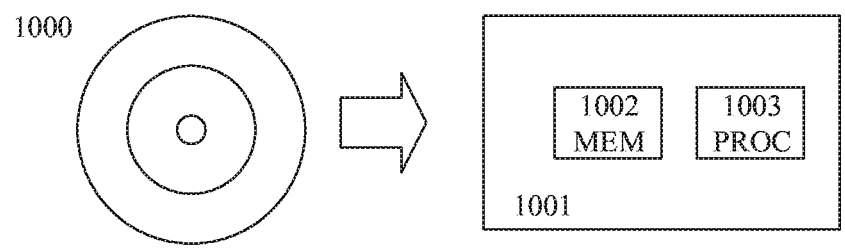
FIG. 10 is a schematic drawing illustrating a computer program product according to some embodiments.

FIG. 10 illustrates an example computer program product program according to some embodiments. According to some embodiments, computer program product comprises a computer readable medium 1000 such as, for example, a diskette or a CD-ROM. The computer readable medium may have stored thereon a computer program comprising program instructions. The computer program may be loadable into a data-processing unit 1001, which may, for example, be comprised in a mobile terminal. When loaded into the data-processing unit, the computer program may be stored in a memory (MEM) 1002 associated with or integral to the data-processing unit (PROC) 1003.

Figure 12:
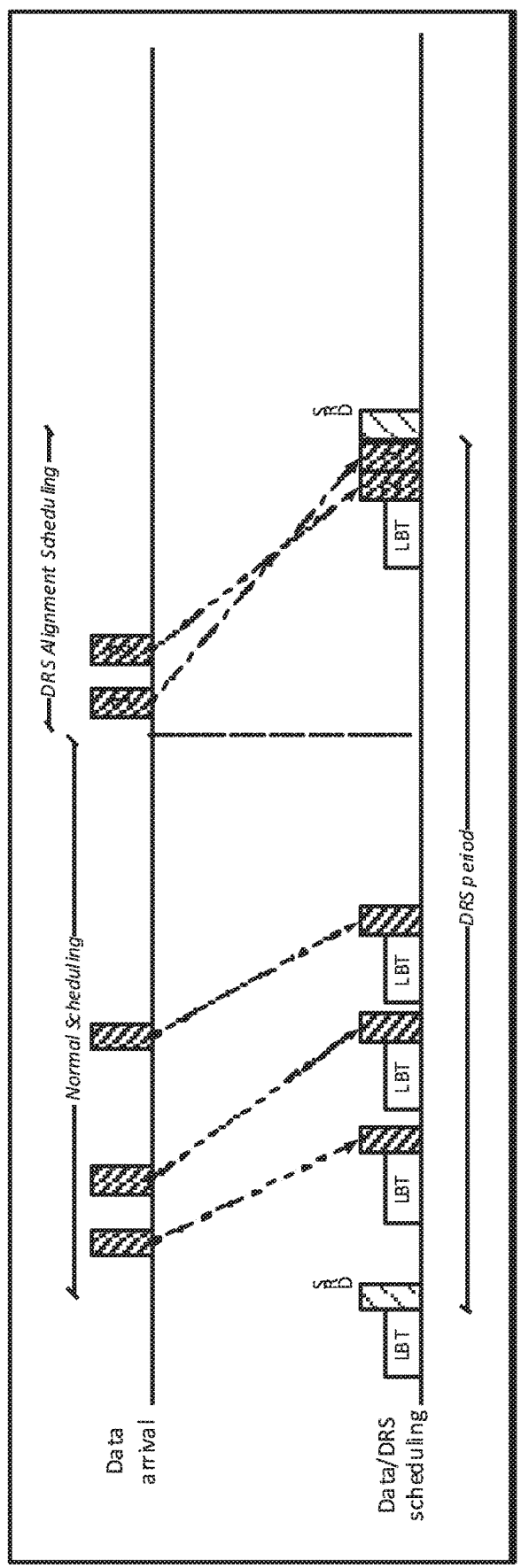
FIG. 12 is a schematic drawing illustrating the DRS Alignment Scheduling according to one embodiment of the teachings disclosed herein.

According to some embodiments, the computer program may, when loaded into and run by the data-processing unit, cause the data-processing unit to execute method steps according to, for example, the methods disclosed herein such as that shown FIGS. 11 and 12.

The solution is implemented in the eNB which is serving the unlicensed band, here known as the LAA SCell or a stand-alone LTE-Standalone cell (e.g. MulteFire). The LAA/LTE-Standalone has user data for its set of UEs which it is serving. One task of the eNB is to provide steady occasions of DRS signals for the UEs to perform coarse/fine synchronization. That is to set the timing, frequency and gain settings in its receiver chain to optimally receive the transmissions from the eNB period.

Another function of the eNB is to deliver user data with the highest possible quality. Data is arriving asynchronously to the eNB and is sent out soon as possible. Each data transmission of 4 ms requires a Category 4 LBT.

The data transmission may in some embodiments also be 2, 3, 4, 8,10 (ms) as defined by 3GPP TS 36.213 § 15.1.1.

Since both procedures require LBT, it could be possible to combine the transmissions to include the DRS and the data together by slightly delaying a data PDU to be placed in the SF just before the DRS.

It is probably not feasible to delay the data by the full DRS period, which is typically 40 ms but rather select the data that arrives close to and before the DRS occasion.

With this background, the following method can be applied in scheduling the data, see FIG. 11 and also FIG. 12 schematically illustrating the DRS Alignment Scheduling.

According to some embodiments, a zone is defined 1110 before the DRS occasion called DRS Alignment Scheduling. Data arriving at the scheduler is a candidate for delaying in order to be positioned in the subframe just before the DRS occasion. Low latency data arriving in this zone does not have to be subject to this type of delay scheduling.

Thus, only suitable data is delayed. In some embodiments, the method may comprise checking whether the arriving data is suitable to be delayed prior to actually delaying it.

The method also comprises filling up 1120 the subframes with subframe (SF) N-1 first and then going backwards in time in order to build up a contiguous 4 ms burst size (or any other burst size allowed in a particular region).

Subframe N may denote the subframe comprising the DRS.

Thus, arriving data which is suitable for delay will be placed so that subframe N-1 is filled up first, then N-2, N-3 etc. until a 4 ms burst size (compare with FIG. 12) of data has been achieved.

When the time to transmit the contiguous data/DRS burst is reached, Category 4 LBT is performed 1130.

Inherently, Category 4 LBT is gentle but performing it in advance adds to the probability of successful transmission.

If the Category 4 LBT fails in transmitting the data, just before the DRS occasion the scheduler reverts 1140 to the higher priority Category 2 LBT in order to transmit the DRS.

In some embodiments, the LBT category used if the LBT category 4 fails may be 25 μs single-CCA as defined in 3GPP TS 36.213-§ 15.1.2 V13.2.0.

If data is scheduled using semi-persistent scheduling, it can be configured 1150 to occupy the subframe preceding the DRS occasion.

FIG. 12 illustrates schematically how data may be scheduled according to some embodiments compared to prior art.

In prior art systems, a DRS frame is preceded by a listen before talk period. Then each incoming data is transmitted, also preceded by a listen before talk period.

However, according to some embodiments, the DRS frame and incoming data is delayed so that only one listen before talk period is needed prior to transmitting both data and DRS frame in the same burst (compare with the method of FIG. 11).

The DRS frame is transmitted in the end of the transmission burst and is immediately preceded by the data frame which came in first (i.e. data frame 1). Data frame 1 is in turn immediately preceded with the data frame that came in last (i.e. data frame 2).

It may be beneficial in some embodiments to transmit the DRS frame after the delayed data frames since the start time of data transmissions is more flexible than the start time of the DRS. Flexibility is increased since the category 4 LBT may start at any time and partial subframes may be used for initiating the transmission, whereas the DRS may only start at a full subframe boundary.

However, in some embodiments, the DRS frame may be transmitted prior to the delayed data, i.e. first in the transmission burst.

EMBODIMENTS

One embodiment relates to a method implemented in a network node for DRS Alignment Scheduling comprising:
 defining a zone before the DRS occasion called DRS Alignment Scheduling. Data arriving at the scheduler is a candidate for delaying in order to position it in the subframe just before the DRS occasion. Low latency data arriving in this zone does not have to be subject to this type of delay scheduling;
 filling up the subframes with SF N-1 first and then going backwards in time in order to build up a contiguous time period;
 perform Category 4 LBT when the time to transmit the contiguous data/DRS burst is reached;
 if the Category 4 LBT fails in transmitting the data, just before the DRS occasion the scheduler reverts to the higher priority Category 2 LBT in order to transmit the DRS; and
 if data is scheduled using semi-persistent scheduling, it can be configured to occupy the subframe preceding the DRS occasion.

In some embodiments the scheduler reverts to a 25 μs single-CCA as defined in 3GPP TS 36.213-§ 15.1.2 V13.2.0.

One embodiment relates to an arrangement, such as a network node, for DRS Alignment Scheduling, the arrangement being configured for:
 defining a zone before the DRS occasion called DRS Alignment Scheduling. Data
  arriving at the scheduler is a candidate for delaying in order to position it in the subframe just before the DRS occasion. Low latency data arriving in this zone does not have to be subject to this type of delay scheduling;
 filling up the subframes with SF N-1 first and then going backwards in time in order to build up a contiguous time period;
 perform Category 4 LBT when the time to transmit the contiguous data/DRS burst is reached;
 if the Category 4 LBT fails in transmitting the data, just before the DRS occasion the scheduler reverts to the higher priority Category 2 LBT in order to transmit the DRS; and
 if data is scheduled using semi-persistent scheduling, it can be configured to occupy the subframe preceding the DRS occasion.

In some embodiments the scheduler reverts to a 25 μs single-CCA as defined in 3GPP TS 36.213-§ 15.1.2 V13.2.0.

One embodiment relates to a method implemented in a network node for transmitting data to a wireless device, time aligned with a periodic high priority transmission comprising the steps of:
 defining a zone prior to the occasion of the periodic high priority transmission where data packets could be aligned
 identifying suitable data packets to schedule in the zone prior to the periodic high priority transmission performing a clear channel assessment
transmitting the periodic high priority transmission and potentially the data packets.

In one embodiment the size of the zone depends on the delay requirements of the data packets to be transmitted.

In one embodiment suitable means that the delay requirements are fulfilled.

In one embodiment suitable means packets scheduled with semi-persistent scheduling.

In one embodiment the channel assessment is aggressive if the channel is not clear close to the desired time of the periodic high priority transmission and gentle otherwise.

In one embodiment aggressive means Category 2 LBT and gentle means Category 4 LBT.

In one embodiment aggressive means a 25 µs single-CCA as defined in 3GPP TS 36.213-§ 15.1.2 V13.2.0.

In one embodiment data packets are only transmitted if a gentle clear channel assessment was done.

In one embodiment the high priority periodic transmission is a LTE DRS transmission.

What is claimed is:

1. A method, implemented in a network node, for transmitting data to a wireless device, wherein the data is time aligned with a periodic high priority transmission, the method comprising the network node:
defining a zone prior to occurrence of the periodic high priority transmission where data packets could be aligned;
identifying suitable data packets to schedule in the zone prior to the periodic high priority transmission;
performing a clear channel assessment (CCA); and
transmitting the periodic high priority transmission.

2. The method of claim 1:
wherein data arriving at the network node is delayed in order to be positioned in at least one subframe to be transmitted prior to, but in conjunction with an occasion of the periodic high priority transmission, wherein low latency data arriving in the zone is not delayed; and
wherein the method further comprises filling up a subframe being closest in time to the periodic high priority transmission occasion with delayed data first and then filling up a number of subframes preceding the subframe being closest in time to the periodic high priority transmission occasion in order to build up a contiguous time period of subframes comprising delayed data.

3. The method of claim 1, wherein a size of the zone depends on delay requirements of the data packets to be transmitted.

4. The method of claim 3, wherein the data packets are defined as suitable if the delay requirements are fulfilled.

5. The method of claim 1, wherein the data packets are defined as suitable if they are scheduled with semi-persistent scheduling.

6. The method of claim 1, wherein the CCA is aggressive if the channel is not clear close to the desired time of the periodic high priority transmission and gentle otherwise.

7. The method of claim 6, wherein the aggressive CCA is achieved using Category 2 listen-before-talk (LBT) and gentle channel assessment is achieved using Category 4 LBT.

8. The method of claim 7:
wherein the Category 2 LBT comprises LBT without random back-off;
wherein Category 4 LBT comprises LBT with random back-off and a variable size of a contention window.

9. The method of claim 7, wherein data packets are only transmitted if a gentle clear channel assessment was done.

10. The method of claim 1, wherein the high priority periodic transmission is a Long Term Evolution (LTE) Discovery Reference Signal (DRS) transmission.

11. A network node for transmitting data to a wireless device, wherein the data is time aligned with a periodic high priority transmission, the network node comprising:
processing circuitry;
memory containing instructions executable by the processing circuitry whereby the network node is operative to:
define a zone prior to occurrence of the periodic high priority transmission where data packets could be aligned;
identify suitable data packets to schedule in the zone prior to the periodic high priority transmission;
perform a clear channel assessment (CCA); and
transmit the periodic high priority transmission.

12. The network node of claim 11, wherein the instructions are such that the network node is operative to:
delay data arriving at the network node in order to be positioned in at least one subframe to be transmitted prior to, but in conjunction with an occasion of the periodic high priority transmission, wherein low latency data arriving in the zone is not delayed; and
fill up a subframe being closest in time to the periodic high priority transmission occasion with delayed data first and then fill up a number of subframes preceding the subframe being closest in time to the periodic high priority transmission occasion in order to build up a contiguous time period of subframes comprising delayed data.

13. The network node of claim 11, wherein a size of the zone depends on delay requirements of the data packets to be transmitted.

14. The network node of claim 13, wherein the instructions are such that the network node is operative to define the data packets as suitable if the delay requirements are fulfilled.

15. The network node of claim 11, wherein the instructions are such that the network node is operative to define the data packets as suitable if they are scheduled with semi-persistent scheduling.

16. The network node of claim 11, wherein the CCA is aggressive if the channel is not clear close to the desired time of the periodic high priority transmission and gentle otherwise.

17. The network node of claim 16, wherein the aggressive CCA is achieved using Category 2 listen-before-talk (LBT) and gentle channel assessment is achieved using Category 4 LBT.

18. The network node of claim 17:
wherein the Category 2 LBT comprises LBT without random back-off;
wherein Category 4 LBT comprises LBT with random back-off and a variable size of a contention window.

19. The network node of claim 17, wherein the instructions are such that the network node is operative to transmit the data packets only if a gentle clear channel assessment was done.

20. The network node of claim 11, wherein the high priority periodic transmission is a Long Term Evolution (LTE) Discovery Reference Signal (DRS) transmission.

* * * * *